US010757145B2

(12) United States Patent
Toutain et al.

(10) Patent No.: US 10,757,145 B2
(45) Date of Patent: Aug. 25, 2020

(54) METHOD AND DEVICE FOR ESTABLISHING WEBRTC COMMUNICATIONS

(71) Applicant: Orange, Paris (FR)

(72) Inventors: Francois Toutain, Lannion (FR); Emmanuel Le Huerou, Saint Quay Perros (FR)

(73) Assignee: ORANGE, Paris (FR)

( * ) Notice: Subject to any disclaimer, the term of this patent is extended or adjusted under 35 U.S.C. 154(b) by 362 days.

(21) Appl. No.: 15/213,067

(22) Filed: Jul. 18, 2016

(65) Prior Publication Data

US 2017/0019435 A1 Jan. 19, 2017

(30) Foreign Application Priority Data

Jul. 17, 2015 (FR) ...................... 15 56780

(51) Int. Cl.
*G06F 15/16* (2006.01)
*H04L 29/06* (2006.01)
(Continued)

(52) U.S. Cl.
CPC ...... *H04L 65/1069* (2013.01); *H04L 12/1818* (2013.01); *H04L 51/046* (2013.01);
(Continued)

(58) Field of Classification Search
CPC ... H04L 12/1818; H04L 51/046; H04L 51/18; H04L 51/36; H04L 65/1069; H04L 67/02; H04L 67/141; H04L 67/146; H04W 4/16
(Continued)

(56) References Cited

U.S. PATENT DOCUMENTS 9,660,995 B2* 5/2017 Reiter ................ H04L 63/0428
9,871,929 B2* 1/2018 Lv ....................... H04L 65/1069
(Continued)

FOREIGN PATENT DOCUMENTS

EP 2770667 A1 8/2014

OTHER PUBLICATIONS

Frrench Search Report and Written Opinion dated May 3, 2016, for corresponding French Application No. 1556780, filed Jul. 17, 2015.
(Continued)

*Primary Examiner* — Phuoc H Nguyen
(74) *Attorney, Agent, or Firm* — David D. Brush; Westman, Champlin & Koehler, P.A.

(57) ABSTRACT

A method for establishing a web communication between a web browser running on a first terminal and a web browser running on a second terminal, distinct from a communication via a web browser being previously established between the first and second terminals. Following detection, by the first terminal, of a user interaction requesting establishment of a web communication with the second terminal, the first terminal creates a session identifier including at least one identifier of the first terminal, and generates a URL address including the created session identifier. The URL address makes it possible to access a web page to establish the requested web communication, via a server. The URL address is inserted into a message sent to the second terminal, which triggers opening by the browser of the first terminal of a web page downloaded from the server based on the URL address.

10 Claims, 3 Drawing Sheets

(51) Int. Cl.
*H04L 29/08* (2006.01)
*H04L 12/18* (2006.01)
*H04L 12/58* (2006.01)
*H04W 4/16* (2009.01)

(52) U.S. Cl.
CPC .............. *H04L 51/36* (2013.01); *H04L 67/02* (2013.01); *H04L 67/141* (2013.01); *H04L 67/146* (2013.01); *H04L 51/18* (2013.01); *H04W 4/16* (2013.01)

(58) Field of Classification Search
USPC .................................................. 709/217, 227
See application file for complete search history.

(56) References Cited

U.S. PATENT DOCUMENTS

| | | | | |
|---|---|---|---|---|
| 2013/0343534 | A1* | 12/2013 | Nguyen | H04M 3/5191 379/265.09 |
| 2014/0223452 | A1* | 8/2014 | Santhanam | G06F 9/541 719/328 |
| 2014/0237057 | A1* | 8/2014 | Khodorenko | H04L 51/32 709/206 |
| 2015/0033300 | A1* | 1/2015 | Timariu | H04L 63/168 726/5 |
| 2015/0310377 | A1* | 10/2015 | Schlumberger | G06Q 10/063114 705/7.15 |
| 2016/0381091 | A1* | 12/2016 | O'Connor | H04L 65/403 370/260 |

OTHER PUBLICATIONS

"FAQ—appear.in—one click video conversations", Jul. 16, 2015 (Jul. 16, 2015), XP055270252. URL: https://appear.in/information/faq/.

"WebRTC 1.0: Real-time Communication Between Browsers—Working Draft Feb. 10, 2015", Feb. 10, 2015 (Feb. 10, 2015), XP055270239. URL: https://www.w3.org/TR/2015/WD-webrtc-20150210/.

Loreto et al., "Real-Time Communications in the Web: Issues, Achievements, and Ongoing Standardization Efforts", IEEE Internet Computing, IEEE Service Center, New York, NY.—Institute of Electrical and Electronics Engineers, US, vol. 16, No. 5, Sep. 1, 2012 (Sep. 1, 2012), pp. 68-73, XP011466375.

English translation of the Written Opinion dated May 3, 2016, for corresponding French Application No. 1556780, filed Jul. 17, 2015.

Overview: Real Time Protocols for Browser-based Applications—draft-ietf-rtcweb-overview-06—Feb. 20, 2013—http://datatracker.ieff.org/doc/draft-ietf-rtcweb-overview/.

* cited by examiner

US 10,757,145 B2

METHOD AND DEVICE FOR ESTABLISHING WEBRTC COMMUNICATIONS

CROSS-REFERENCE TO RELATED APPLICATIONS

This application claims priority from and the benefit of French Patent Application No. FR1556780, filed Jul. 17, 2015, the content of which is incorporated herein by reference.

FIELD OF THE DISCLOSURE

The present disclosure relates to the establishment of real time communications between web browsers over a communication network such as the Internet.

More specifically, the disclosure relates to the technology of real-time communication between web browsers currently in the process of standardization, jointly by the World Wide Web Consortium (W3C) and the Internet Engineering Task Force (IETF), and designated WebRTC (Web Real-Time Communication) at the W3C and RTCWEB at the IETF.

BACKGROUND OF THE DISCLOSURE

There are communication applications that allow users to communicate in real time by a communication network such as the Internet. Such applications require each user wanting to participate in a real-time communication to have the communication application installed on his or her terminal and such a user to have an account enabling him or her to be identified with the service provider offering the communication application. Some of these communication applications can be integrated in a web browser but they are installed separately from the web browser. For example, such communication applications are known by the names of Skype™, Facebook™, GoogleTalk™, etc.

All the abovementioned products require downloads, native applications or extension modules (plugins) external to the browser. Now, the downloading, installation and updating of plugins is complex, the source of errors and of inconvenience. Moreover, the design, the testing, the updating and the deployment of plugins is complex and costly.

With the development of the HTML5 (HyperText Markup Language 5) language, new perspectives have been opened up to the developers of applications with the possibility of rendering the interfaces (API—Application Programming Interface) with the web applications accessible in a standardized manner within the browser.

Such is the pathway followed by the IETF and the W3C with the RTCWEB/WebRTC standard which aims to provide two types of specifications:

a protocol specification, carried out at the IETF;
a Javascript API specification, carried out at the W3C.

The abovementioned two specifications aim to provide an environment whereby a Javascript application incorporated in any web page, read by any compatible browser, and allowed in an appropriate manner by its user, is capable of establishing a communication using audio, video (and auxiliary data), without the platform of the browser limiting the types of application in which this communication functionality can be used.

According to the current RTCWEB/WebRTC standard, a web browser must implement three API interfaces to be able to receive and transmit data in a streaming mode, these APIs are as follows:

MediaStream: allows the browser to access the streams of data such as those from the web cam and from the microphone of the terminal of the user;
RTCPeerConnection: handles audio or video calls, with encryption and bandwidth management mechanisms;
RTCDataChannel: handles peer-to-peer communication for genetic data.

To obtain more information concerning the RTCWEB/WebRTC specifications, the following documents can in particular be consulted:

WebRTC 1.0: Real-time Communication Between Browsers—W3C Editor's Draft 22 Mar. 2013—accessible on the Internet at the following address: http://dev.w3.org/2011/webrtc/editor/webrtc.html#rtcpeerconnection-interface Overview: Real Time Protocols for Browser-based Applications—draft-ietf-rtcweb-overview-06—Feb. 20, 2013—accessible on the Internet at the following address:

http://datatracker.ietf.org/doc/draft-ietf-rtcweb-overview/

Currently, web browser publishers are offering trial versions of this new service between browsers, for example Google with the Chrome™ browser, Mozilla with the Firefox™ browser, Ericsson with the browser called Bowser™ developed for cell phones.

In the versions offered to date, which conform to the RTCWEB/WebRTC specifications, when a first user wants to establish an audio or video communication, from his or her WebRTC-compatible web browser, with a second user over the Internet, he or she begins by logging on via his or her browser to an application server providing the WebRTC communication service. After a possible authentication operation, the browser loads, via a web page, the web application (Javascript application) conforming to the RTCWEB specifications and adapted to interact with the abovementioned APIs (conforming to the WebRTC specifications) which are natively incorporated in the browser.

Next, the first user chooses, via the web page for connecting to the application server, an identifier of the second user, then enters a command—for example by a click on an action button displayed in the web page open in the browser—to trigger the audio or video call to the second user. Typically, the web page opened in the browser then displays a message indicating that the connection is currently being established.

If the second user, the recipient of the call, is also connected to the same WebRTC communication service provided by the application server, then he or she can accept the audio or video call from the first user, and the communication will then be able to established.

It thus emerges that, for a WebRTC communication to be established between two users, both users have to be connected to the application server. In order to not miss a communication request, the terminal of the called user must then permanently run a web browser thus using resources, and in particular the battery, of the terminal. This can be problematical in the case of mobile terminals.

Furthermore, the called user must be able to be identified by the application server to receive a communication request originating from the calling user. The called user must therefore have an account with the provider of the application server. To request a communication to the called user, the calling user must also know with which provider the user of the called terminal can be reached.

A WebRTC real-time communication service is to be found on the website https://appear.in. This communication service allows a user wanting to establish a WebRTC video communication to obtain a URL pointing to a video chat that can include up to 8 users connected to the chat. The user can then copy the URL obtained in a message and send it to the users with whom he or she wants to communicate. When the other users access the web page to which the URL points, they are connected with the user via the video chat. Such a service requires the user to go and visit the website of the service when he or she wants to establish a communication with other users, create a chat room to obtain the URL, copy the URL into a message and inform the recipients of the message to whom he or she wants to send it. All these steps are tedious for the user, above all if he or she wants to communicate from a mobile terminal.

SUMMARY

An exemplary embodiment of the invention relates to a method for establishing a communication called web communication between a web browser running on a first terminal and a web browser running on a second terminal, comprising a step of detection, by the first terminal, of a user interaction requesting the establishment of a communication with the second terminal, a communication according to a communication mode distinct from a communication via a web browser being previously established between the first terminal and the second terminal, the detection of the user interaction triggering:
- a step of creation of a session identifier comprising at least one identifier of the first terminal,
- a step of generation of a URL address comprising said created session identifier, said URL address making it possible to establish a communication session via a server,
- a step of insertion of said URL address into a message intended for the second terminal,
- a step of sending of the message to the second terminal triggering the opening by the browser of the first terminal of a web page downloaded from the server using said URL address.

An embodiment of the invention applies to any type of communication that can be established between two web browsers and in particular to the communication sessions according to the WebRTC technology.

Thus, by virtue of an embodiment of the invention, the establishment of a communication session according to the WebRTC technology is simplified for a user of a terminal. The method according to an embodiment of the invention makes it possible to obtain a unique session identifier constructed notably from an identifier of the first terminal. This unique session identifier allows a server providing a WebRTC communication service to identify a web page via which the requested WebRTC communication is established.

The sending of the message by the first terminal to the second terminal triggers the opening of the web page by the browser of the first terminal. The user of the first terminal thus does not need to go to a website offering a WebRTC communication service.

Furthermore, the second terminal is informed of the communication request via the reception of a message comprising a link to the WebRTC communication. The user of the second terminal now only has to click on the link contained in the message to participate in the WebRTC communication. Thus, the second terminal does not need to have a web browser permanently running on the second terminal to receive a WebRTC communication request. The method thus makes it possible to switch easily from a communication mode, for example asynchronous, of SMS type, to a web communication mode of WebRTC type.

The various embodiment modes or features mentioned hereinbelow can be added independently or in combination with one another, to the steps of the method defined above.

According to a particular embodiment of the invention, the communication previously established between the first terminal and the second terminal according to a communication mode distinct from a web communication is a communication by text messages implemented by a text message communication application.

Thus, the user of the first terminal dialoguing by text messages with the user of the second terminal, can request a switchover to another communication mode by the sending of a message including the appropriate URL address and via this same text message communication mode.

The user of the first terminal can request the establishment of a WebRTC communication with a second terminal simply, for example by activating a call button from an application run by the first terminal, outside of the web browser of the first terminal. For example, such an application can be an SMS or instant messages application, or a call log or even a directory of the contacts of the first terminal. Such applications are then interfaced with a software module capable of implementing the method according to an embodiment of the invention.

The interfaces of these applications are provided with a new call button intended to establish communication according to the WebRTC technology.

According to another particular embodiment of the invention, the action button is displayed in association with information relating to the communication previously established between the first terminal and the second terminal according to a communication mode distinct from the WebRTC technology.

It can also be displayed in association with contact information relating to the second terminal. According to this particular embodiment, the user of the first terminal can easily select a contact with whom he or she wants to establish a WebRTC communication from a message or a call previously exchanged with this contact, or else from his or her directory.

The first terminal obtains an identifier of the second terminal without the user of the first terminal needing to inform it.

According to another particular embodiment of the invention, the message comprising the URL address is displayed in a text composition box of a graphical interface of the text message communication application.

The user of the first terminal can thus modify the message comprising the URL address before sending it to the second terminal, for example to insert a private message intended for the user of the second terminal.

According to another particular embodiment of the invention, after the sending of the message comprising the URL address, said message is saved by the first terminal with the messages exchanged between the first terminal and the second terminal via the text message communication application.

The user of the first terminal can thus have subsequent access to the established WebRTC communication, by clicking on the link. For example, the server can then display a web page comprising information relating to the communication (date, time, information on the second terminal, transcription of the chat, audio/video recording of the communication, etc.). According to another particular embodiment of the invention, the sending of the message triggers, prior to the opening of the web page, the running of an occurrence of the web browser of the first terminal.

The user of the first terminal can thus trigger WebRTC communications without requiring interactions via his or her web browser. To establish a WebRTC communication, the web browser of the first terminal is run only when necessary, at the request of the user of the terminal. The resources of the first terminal are thus protected.

According to another particular embodiment of the invention, after a predetermined time since the sending of the message and when the web communication is not established with the second terminal, a session expiration notification sent by the server is received by the first terminal.

When the user of the second terminal does not want to establish the web communication or when he or she has not seen the message comprising the URL, the user of the first terminal is informed after a predetermined time, for example 1 minute, that the communication session has expired. He or she can then choose another means of communication with the second terminal.

According to another particular embodiment of the invention, the method further comprises a step of reception, by the first terminal, of a web page sent by the server, said web page indicating that the second terminal has not been able to establish the requested web communication.

Thus, the user of the first terminal is informed that the WebRTC communication is not possible, for example because the browser of the second terminal is not WebRTC compatible. An embodiment of the invention relates also to a device for establishing a communication called web communication between a web browser running on a first terminal and a web browser running on a second terminal, a communication according to a communication mode distinct from a communication via a web browser being previously established between the first terminal and the second terminal, comprising:
- a module for detecting a user interaction requesting the establishment of a web communication with the second terminal,
- a module for creating a session identifier comprising at least said identifier of the first terminal,
- a module for generating a URL address comprising said created session identifier, said URL address making it possible to establish a web communication session via a server,
- a module for inserting said URL address into a message intended for the second terminal,
- a module for sending the message to the second terminal, suitable for triggering, by the web browser of the first terminal, the opening of a web page downloaded from the server based on said URL address.

An embodiment of the invention relates also to a terminal comprising a device as described above.

In a particular embodiment of the invention, the different steps of the method are implemented by computer program instructions.

Consequently, an embodiment of the invention also targets computer programs on an information medium, these programs being likely to be implemented respectively in a terminal or, more generally, in a computer, these programs respectively comprising instructions suitable for implementing the different steps of the method which has just been described.

These programs can use any programming language, and be in the form of source code, object code, or intermediate code between source code and object code, such as in a partially compiled form, or in any other desirable form.

An embodiment of the invention also targets an information medium that can be read by a computer, and comprising instructions of a computer program as mentioned above.

The information medium can be any unit or device capable of storing the program. For example, the medium can comprise a storage means, such as a ROM, for example a CD ROM or a microelectronic circuit ROM, or even a magnetic or electronic recording means, for example a USB key or a hard disk.

Also, the information medium can be a transmissible medium such as an electrical or optical signal, which can be routed via an electrical or optical cable, by radio or by other means. The program according to an embodiment of the invention can in particular be downloaded over a network of Internet type.

Alternatively, the information medium can be an integrated circuit in which the program is incorporated, the circuit being suitable for executing or being used in the execution of the method concerned.

The advantages of the terminal, of the device and of the computer program comprising instructions suitable for implementing the different steps of the method are identical to those presented in relation to the method according to any one of the particular embodiments mentioned above.

BRIEF DESCRIPTION OF THE DRAWINGS

Other advantages and features of the invention will become more clearly apparent on reading the following description of a particular embodiment of the invention, given as a simple illustrative and nonlimiting example, and the attached drawings, in which.

DETAILED DESCRIPTION OF ILLUSTRATIVE EMBODIMENTS

Figure 1:
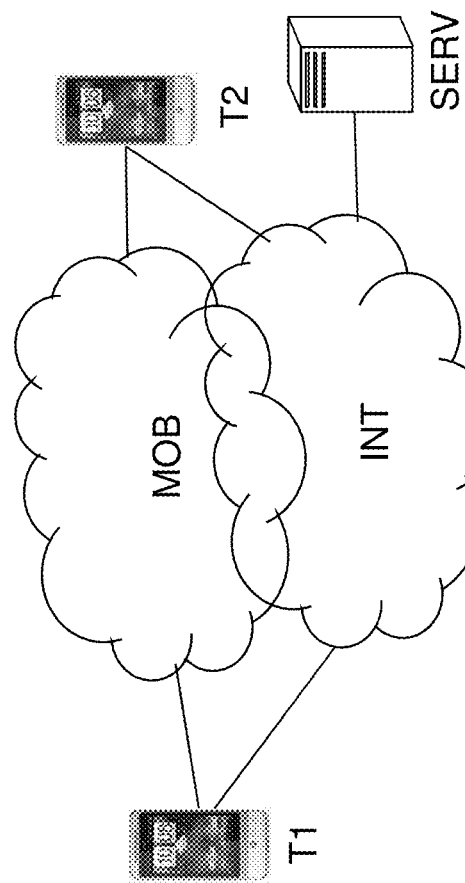
FIG. 1 illustrates an environment of implementation of the invention according to a particular embodiment of the invention, FIG. 2 schematically illustrates steps of the method for establishing a communication according to the WebRTC technology according to a particular embodiment of the invention.

FIG. 1 comprises a first terminal T1 and a second terminal T2. The terminals T1 and T2 are for example mobile terminals capable of making and receiving telephone and/or video phone communications via a mobile communication network MOB, such as a 2G/3G or 4G cellular communication network.

The terminals T1 and T2 are also capable of connecting to a data network INT, such as the Internet. For that, the terminals T1 and T2 have a web browser installed on each terminal. The web browser NAV of the terminal T1 is compatible with the WebRTC/RCTWEB standard.

The web browser of the terminal T1 is suitable for establishing communications according to the WebRTC technology with other terminals via the network INT. Such communications are for example established using a WebRTC communication service provided by a server SERV connected to the network INT.

The terminal T1 also has communication applications such as an SMS text message communication application, an instant messaging application, a telephone and/or video phone communication application, a directory application, etc. Such applications are applications run by the terminal T1 outside of the web browser of the terminal T1.

According to a particular embodiment of the invention, steps of the method according to the invention are implemented by a software module LOGI installed on the terminal T1 and which is interfaced with at least one of these applications on the terminal T1.

The software module LOGI may have been installed on the terminal T1 simultaneously with the installation of the application with which it is interfaced. Alternatively, the software module may also have been downloaded and installed subsequent to the installation of this application.

Figure 2:
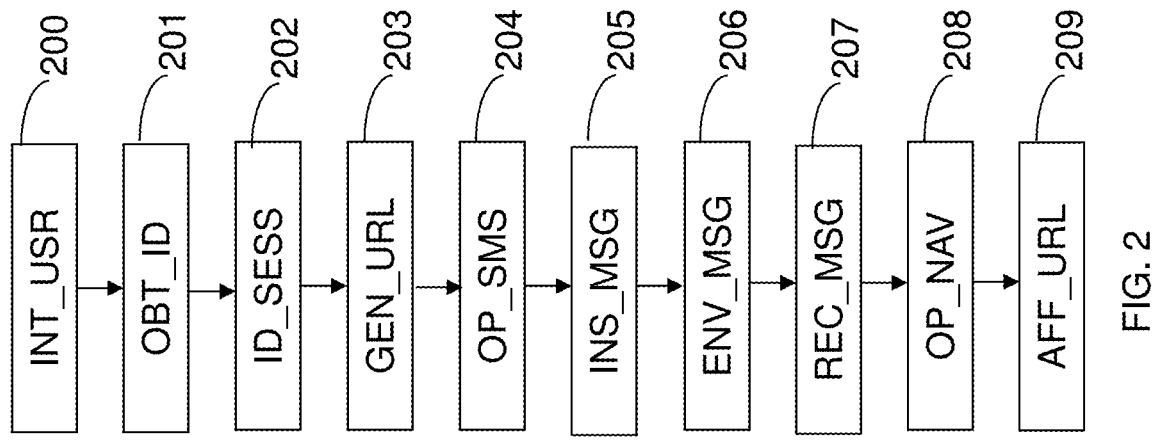

FIG. 2 illustrates steps of the method for establishing a communication between a web browser of the terminal T1 and a web browser of the terminal T2, for example according to the WebRTC technology, according to a particular embodiment of the invention. The method is for example implemented by the terminal T1 of FIG. 1. In a step 200, the terminal T1 detects, via its user interaction module, a user interaction requesting the establishment of a communication according to the webRTC technology with a contact C1. For example, the contact C1 is a user of the terminal T2 illustrated in FIG. 1.

For example, in the step 200, the user interaction is detected from a graphical interface of a text message communication application, such as an SMS or instant messaging application. An example of a graphical interface of such an application is represented by FIG. 3A.

Figure 3C:
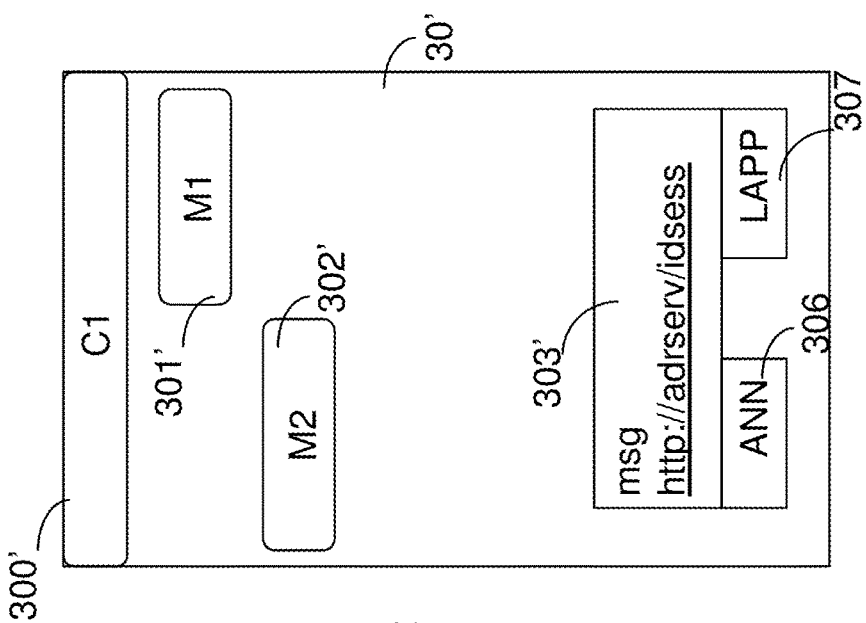
FIGS. 3A to 3E illustrate graphical interfaces of a terminal that can implement the method for establishing a WebRTC communication according to a particular embodiment of the invention.
Figure 3B:
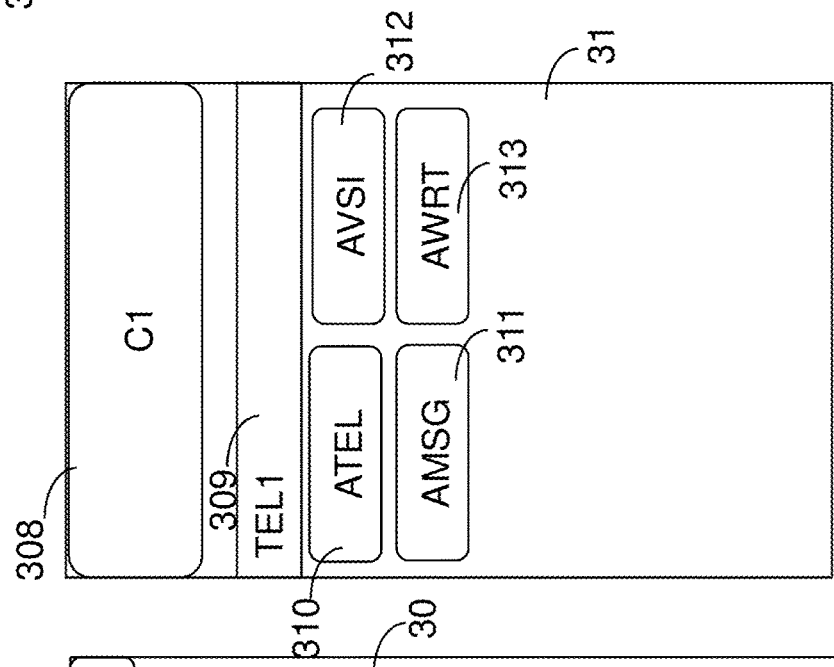
Figure 3A:
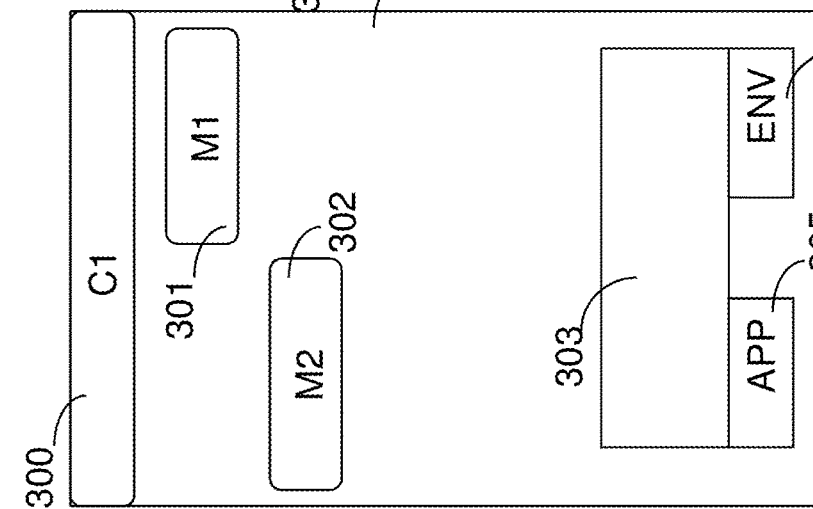

The graphical interface of FIG. 3A comprises a display zone 30 comprising a box 300 in which the name of a contact C1 of the terminal T1 is indicated. The display zone 30 also comprises a set of text messages 301, 302 exchanged previously between the terminal T1 and the contact C1: the message 301 is a text message sent by the terminal T1 to the contact C1, the message 302 is a text message received by the terminal T1 originating from the contact C1. The display zone 30 also comprises a text message composition field 303 allowing a user of the terminal T1 to compose a message intended for the contact C1. The composition field 303 is associated with a first action button 304 making it possible, via a user interaction on this button, for the user of the terminal T1 to send to the contact C1 a message composed in the composition field 303.

Thus, a communication according to a communication mode distinct from a communication via a web browser is previously established between the first terminal T1 and the second terminal T2 by a text message communication application.

According to an embodiment of the invention, the composition field 303 is also associated with an action button 305 making it possible, via a user interaction on such a button 305, for a user of the terminal T1 to send to the contact C1 a request for establishment of a communication according to the WebRTC technology.

According to a particular embodiment of the invention, in the step 200, the user of the terminal T1 interacts on the action button 305.

According to another example illustrated in FIG. 3B, in the step 200, the user interaction is detected from a graphical interface of a directory application of the terminal T1. FIG. 3B illustrates a contact sheet of the terminal T1 corresponding to the contact C1. FIG. 3B comprises a display zone 31 notably comprising:

a box 308 indicating the name C1 of the contact,
contact information 309 of the contact C1, for example a telephone number TEL1 of the contact C1,
action buttons 310, 311, 312 allowing the user of the terminal T1 to send to the contact C1, via the communication network MOB, respectively a telephone communication request, or a video phone communication request, or a text message.

According to an embodiment of the invention, the display zone 31 also comprises an action button 313 allowing the user of the terminal T1 to send to the contact C1 a request to establish a communication according to the WebRTC technology.

According to this example, in the step 200, the user of the terminal T1 interacts on the action button 313.

Other examples of graphical interfaces and application run by the terminal T1 having an action button such as the action button 305 or 313 are possible.

The detection of the user interaction triggers, in a step 201, the obtaining by the terminal T1 of an identifier IDT1 of the terminal T1. Such an identifier IDT1 can be an identifier contained in the SIM card of the terminal T1 or a telephone number of the terminal T1 or even an identifier of the terminal T1 dedicated to the communication service according to the webRTC technology and supplied by the server SERV.

In a step 202, the terminal T1 creates a session identifier IDSESS comprising at least the identifier of the terminal T1 obtained in the step 201. Such an identifier IDSESS is unique for the server SERV and makes it possible for the server SERV to identifier the webRTC communication session initiated by the terminal T1. According to a particular embodiment of the invention, the session identifier IDSESS corresponds to the identifier of the terminal T1 IDT1 to which is concatenated a session number NUM. Such a session number was initialized with the value 0 when the terminal T1 installed the software module LOGI. Then, the session number is incremented by 1 on each new webRTC communication session initiated by the terminal T1.

According to another particular embodiment of the invention, the session identifier IDSESS corresponds to the identifier of the terminal T1 IDT1 to which is concatenated a time stamp corresponding to the instant when the user of the terminal T1 initiated the communication session. Such a time stamp comprises the year, the month, the day, the hour, the minute and, possibly, the second of the instant at which the user of the terminal T1 initiated the communication session.

According to another particular embodiment of the invention, the session identifier IDSESS corresponds to the identifier of the terminal T1 IDT1 to which is concatenated an identifier of the contact C1 or of the terminal T2; and either a session number or a time stamp of the instant of initiation of the communication session.

Other particular embodiments of the invention are possible for ensuring the uniqueness of the session identifier IDSESS.

In a step 203, the terminal T1 generates a URL address, comprising the session identifier IDSESS created. Such a URL address is generated from an address of the server SERV which has previously been configured within the terminal T1. The URL address generated has the following form:

http://adrserv/idsess in which adrserv corresponds to the address of the server SERV and idsess corresponds to the session identifier IDSESS created in the step 202.

According to a particular embodiment of the invention, when the communication application, via which the user of the terminal T1 initiates the request for communication with the terminal T2 according to the WebRTC technology, is different from a text message application, in a step 204, the terminal T1 opens a text message application. For example, such an application is an SMS message application.

FIG. 3C illustrates a graphical interface of such an application. The graphical interface of FIG. 3C comprises a display zone 30' comprising a box 300' in which the name of the contact C1 of the terminal T1 is indicated. The display zone 30' also comprises a set of text messages 301', 302' exchanged previously between the terminal T1 and the contact C1. The display zone 30' also comprises a text message composition field 303' allowing a user of the terminal T1 to compose a message intended for the contact C1.

The composition field 303' is associated with an action button 306' making it possible, via a user interaction on this button, for the user of the terminal T1 to cancel the drafting of the message currently being composed in the composition field 303'.

The composition field 303' is also associated with an action button 307' making it possible, via a user interaction on such a button 307', for a user of the terminal T1 to send to the contact C1 the message composed in the composition field 303'.

According to an embodiment of the invention, in a step 205, the terminal T1 inserts into the composition field 303' a message msg and the URL generated. The result of the step 205 is illustrated by FIG. 3C. The message "msg" may for example take the form of: "your correspondent wants to establish a communication, to accept click on the following link:".

The message contained in the composition field 303' can be edited and modified by the user. The user can thus modify the message "msg" in order to customize it. For example, the user of the terminal T1 can delete the message "msg" and insert another message of the form "let's talk?".

The URL address inserted into the composition field 303' cannot however be modified. Thus, the URL address allowing the terminal T1 and the terminal T2 to access the communication session remains untouched. The errors linked to the access to the communication session are thus avoided.

In a step 206, when the user of the terminal T1 interacts on the action button 307 illustrated in FIG. 3C, the terminal T1 sends to the terminal T2 the message inserted into the composition field 303' and containing the URL address generated. For example, the sending of such a message is implemented in a known manner according to an SMS message sending protocol via the network MOB. The recipient field of the message is filled automatically with an identifier of the contact C1 or of the terminal T2. Such an identifier is obtained by the application of text messages from a memory space of the terminal T1 storing the contact information relating to the contact C1.

Following the reception by the terminal T2 of such a message, when the user of the terminal T2 clicks on the URL address contained in the message received, the web browser of the terminal T2 is activated and sent an access request to the web page corresponding to the URL address. The access request is transmitted via the network INT to the server SERV.

According to a particular embodiment of the invention, in a step 207, the message sent in the step 206 is recorded by the terminal T1 with the messages 301' and 302' previously exchanged between the terminal T1 and the contact C1 via the text message application. The result of the step 207 is illustrated by FIG. 3D. The graphical interface illustrated in FIG. 3D is similar to that illustrated in FIG. 3C. In the FIG. 3D, the composition field 303' is now empty since the message previously being composed has been sent to the terminal T2 and no new message is being composed. The action buttons 306 and 307 in FIG. 3C have been replaced in FIG. 3D by the action buttons 304' and 305'. The action buttons 304' and 305' are identical to the action buttons 304 and 305 respectively presented in relation to FIG. 3A. According to the particular embodiment of the invention described here, the graphical interface illustrated in FIG. 3D shows the message 314 sent by the terminal T1 saved with the messages 301' and 302' previously exchanged between the terminal T1 and the terminal T2.

Following the sending of the message to the terminal T2 during the step 206, according to a particular embodiment of the invention, in a step 208, when the web browser is not activated on the terminal T1, the terminal T1 runs an occurrence of its web browser.

In a step 209, the terminal T1 opens, via its web browser, a web page of the webRTC service provided by the server SERV. Such a web page corresponds to the web page pointed to by the URL address generated. The terminal T1 then communicates with the server SERV to ask the server SERV to establish a communication request intended for the terminal T2. Such a communication request is for example transmitted to the server SERV via the RTCPeerConnection API of the web browser.

On reception of the communication request from the terminal T1, the server SERV awaits the reception of a request to access the URL address from the terminal T2.

Figure 3E:
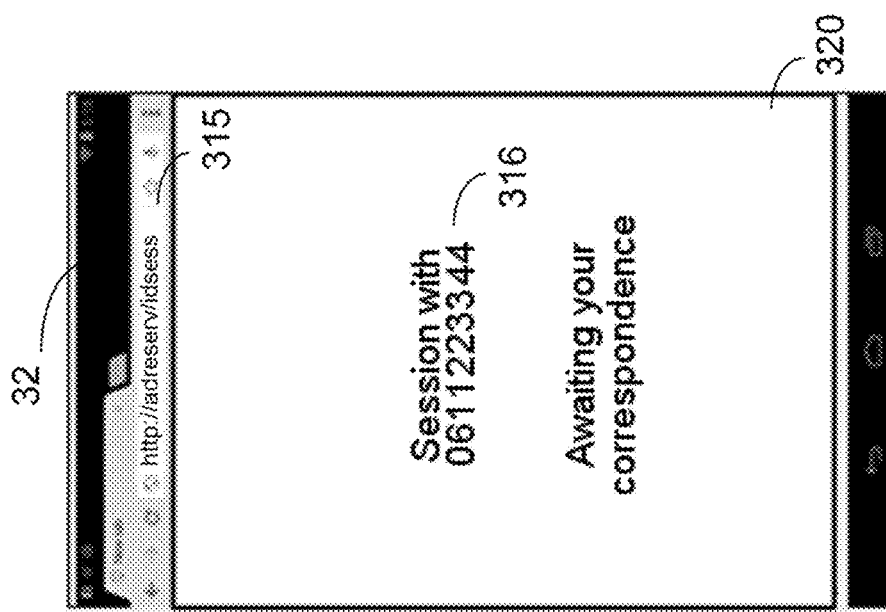
Figure 3D:
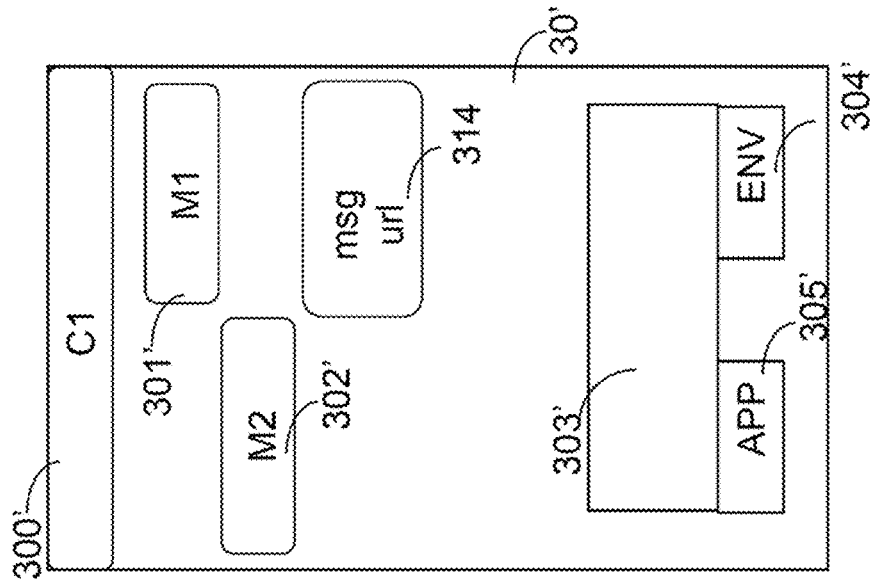

FIG. 3E illustrates a graphical interface 32 of the terminal T1 illustrating the result of the step 209. The graphical interface 32 corresponds to a graphical interface of the web browser of the terminal T1. The graphical interface 32 comprises a frame 315 comprising the URL address of the web page 320 displayed by the web browser of the terminal T1. In the example described here, the URL address is the URL address generated in the step 203. The web page 320 displays a waiting message to the user of the terminal T1 indicating to him or her that the WebRTC communication session is initiated and that the web browser of the terminal T1 is awaiting a response from the terminal T2.

According to a particular embodiment of the invention, following the reception by the server SERV of the communication request sent by the terminal T1 in the step 209, the server SERV measures the time elapsed since the reception of the communication request. After a predetermined elapsed time, for example 1 or 2 minutes, if the terminal T2 has not asked the server SERV for access to the web page pointed to by the URL address received from the terminal T1, the server SERV sends to the terminal T1 a session expiration notification. Such a notification can be a web page displaying a message indicating that the requested communication session has expired.

According to another particular embodiment of the invention, when the web browser of the terminal T2 sends to the server SERV a request to access the web page pointed to by the URL address received from the terminal T1 via an HTTP request, the server SERV checks to see if the web browser of the terminal T2 is compatible with the WebRTC technology. For that, the server SERV checks parameters of the web browser contained in the HTTP access request transmitted by the web browser of the terminal T2.

If the web browser of the terminal T2 is not compatible with the webRTC technology, the server SERV sends to the terminal T1 a web page comprising an error message indicating that the terminal T2 is not compatible to establish a webRTC communication. The server SERV rejects the request sent by the browser of the terminal T2 and sends to the terminal T2 a web page comprising an error message indicating that the web browser of the terminal T2 is not compatible with the webRTC technology.

When the web browser of the terminal T2 is compatible with the webRTC technology, the server SERV sends to the terminal T2 a web page allowing the web browser of the terminal T2 to establish the communication with the web browser of the terminal T1. In this case, the webRTC communication is established in a known manner between the web browser of the terminal T1 and the web browser of the terminal T2, via the server SERV and the network INT.

An embodiment of the invention has been described in the case of communications established between two terminals: T1 and T2. The method according to the invention applies equally to the case of group communications according to the webRTC technology. For example, the user can initiate a webRTC communication from a discussion thread between several contacts. According to another example, the user can initiate a webRTC communication from a contact sheet relating to a group and comprising an identifier for each contact of the group.

According to the particular embodiment of group communications, the recipient field of the message comprising the URL generated comprises an identifier of each contact of the group (obtained from the contact sheet of the group or from the discussion thread) and the message is sent to each contact. Thus, each user of a terminal receiving the message can click on the URL link contained in the message received. The webRTC communication is established as soon as a browser of a terminal other than the terminal T1 accesses the web page pointed to by the URL. The other terminals can then join the group communication by accessing the web page pointed to by the URL.

Figure 4:
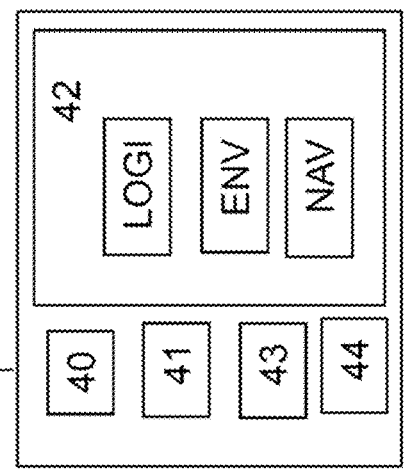
FIG. 4 illustrates a device suitable for implementing the method for establishing a WebRTC communication according to a particular embodiment of the invention.

In the embodiments of the invention which have just been described, the method for establishing a webRTC communication is implemented by a device 4. Such a device 4 has the hardware architecture of a computer, as illustrated schematically in FIG. 4. Thus, the device 4 notably comprises a processor 40, a read only memory 42, a random access memory 41 and communication means 43.

The device 4 also comprises a user interaction module 44 suitable for detecting interactions of a user with the device 4. Such a user interaction module 44 can be any means allowing a user to interact on the terminal T1, such as a touch screen of the device 4, a mouse, a keyboard, voice recognition software, etc.

The read only memory 42 of the device 4 constitutes a storage medium that can be read by the processor 40 and on which is stored a computer program according to an embodiment of the invention, comprising instructions for the execution of the steps of a method for establishing a webRTC communication according to an embodiment of the invention, the steps of this method for establishing a webRTC communication being described with reference to FIGS. 2 and 3A-3E, in particular embodiments of the invention.

This computer program defines, in an equivalent manner, functional modules of the device 4, such as in particular:
a module LOGI suitable for creating a session identifier comprising at least one identifier of the first terminal, generating a URL address comprising said created session identifier, inserting said URL address into a message intended for a second terminal,
a module ENV for sending the message to the second terminal,
a module NAV corresponding to a web browser of the device.

The communication means 43 correspond to a communication module making it possible for the device 4 to communicate with other terminals via the network MOB or the network INT.

The sending module ENV uses in particular the communication module 43 to transmit a message to the second terminal.

The web browser module NAV uses in particular the communication module 43 to transmit requests to access web pages supplied by the server SERV, to receive from the server SERV such web pages and to communicate with the second terminal when a webRTC communication is established with the web browser of the second terminal.

The user interaction module 44 communicates with the software module LOGI to trigger the execution of the steps of creation of a session identifier comprising at least one identifier of the first terminal, of generation of a URL address comprising said created session identifier, and of insertion of said URL address into a message intended for a second terminal.

The sending module ENV communicates with the web browser module NAV in order to trigger the opening of the web page downloaded from the server using said URL address generated following the sending of the message to the second terminal.

According to a particular embodiment of the invention, the software module LOGI communicates with a memory space of the device to obtain an identifier of the device.

The functions of these modules are described in more detail with reference to the steps of the method for establishing a webRTC communication in FIGS. 2 and 3A-3E.

The device 4 can be included in a terminal, such as a cell phone, a computer, a tablet, etc.

Although the present disclosure has been described with reference to one or more examples, workers skilled in the art will recognize that changes may be made in form and detail without departing from the scope of the disclosure and/or the appended claims.

The invention claimed is:

1. A method comprising:
establishing a communication called web communication between a web browser running on a first terminal and a web browser running on a second terminal, wherein a communication by text messages implemented by a text message communication application according to a first communication mode distinct from a communication via a web browser has been previously established and used to exchange a set of text messages between the first terminal and the second terminal, the establishing comprising:
detecting, by the first terminal, a user interaction requesting the establishment of the web communication with the second terminal, wherein detecting the user interaction triggers:
creating a session identifier comprising at least one identifier of the first terminal,
generating a URL address comprising said created session identifier, said URL address making it possible to access a web page of a server to establish the requested web communication, inserting said URL address into a message intended for the second terminal, sending the message to the second terminal using the first communication mode triggering an opening by the web browser of the first terminal of said web page downloaded from the server based on said URL address.

2. The method according to claim 1, in which an action button is displayed in association with information relating to the communication previously established between the first terminal and the second terminal.

3. The method according to claim 1, in which the message comprising the URL address is displayed in a text composition box of a graphical interface of the text message communication application.

4. The method according to claim 1, in which, after the sending of the message comprising the URL address, said message is saved by the first terminal with the messages exchanged between the first terminal and the second terminal via the text message communication application.

5. The method according to claim 1, in which the sending of the message triggers, prior to the opening of the web page, running an occurrence of the web browser of the first terminal.

6. The method according to claim 1, comprising, after a predetermined time since the sending of the message and when the web communication is not established with the second terminal, receiving by the first terminal of a session expiration notification sent by the server.

7. The method according to claim 1, comprising receiving, by the first terminal, a web page sent by the server, said web page indicating that the second terminal has not been able to establish the requested web communication.

8. A first terminal comprising:
a processor;
a non-transitory computer-readable medium comprising instructions stored thereon, which when executed by the processor configure the first terminal to establish a communication called a web communication between a web browser running on the first terminal and a web browser running on a second terminal, wherein a communication by text messages implemented by a text message communication application according to a first communication mode distinct from a communication via a web browser has been previously established and used to exchange a set of text messages between the first terminal and the second terminal, wherein the instructions configure the first terminal to perform acts comprising:
detecting a user interaction requesting the establishment of a web communication with the second terminal,
creating a session identifier comprising at least one identifier of the first terminal,
generating a URL address comprising said created session identifier, said URL address making it possible to access a web page of a server to establish the requested web communication,
inserting said URL address into a message intended for the second terminal,
sending the message from the first terminal to the second terminal using the first communication mode, suitable for triggering, by the web browser of the first terminal, the opening of said web page downloaded from the server based on said URL address.

9. A terminal comprising a device according to claim 8.

10. A non-transitory computer-readable medium comprising a computer program stored thereon, which comprises program code instructions executing a method when the instructions are executed by a processor of a first terminal, wherein the instructions configure the first terminal to perform acts comprising:
establishing a communication called web communication between a web browser running on the first terminal and a web browser running on a second terminal, wherein a communication by text messages implemented by a text message communication application according to a first communication mode distinct from a communication via a web browser has been previously established and used to exchange a set of text messages between the first terminal and the second terminal, the establishing comprising:
detecting, by the first terminal, a user interaction requesting the establishment of the web communication with the second terminal, wherein detecting the user interaction triggers:
creating a session identifier comprising at least one identifier of the first terminal,
generating a URL address comprising said created session identifier, said URL address making it possible to access a web page of a server to establish the requested web communication,
inserting said URL address into a message intended for the second terminal,
sending the message to the second terminal using first communication mode, triggering an opening by the web browser of the first terminal of said web page downloaded from the server based on said URL address.

* * * * *